(12) United States Patent
Lin (10) Patent No.: US 8,678,964 B2
(45) Date of Patent: Mar. 25, 2014

(54) REAR DERAILLEUR

(76) Inventor: Chang Hui Lin, Changhu (TW)

(*) Notice: Subject to any disclaimer, the term of this patent is extended or adjusted under 35 U.S.C. 154(b) by 128 days.

(21) Appl. No.: 13/454,077

(22) Filed: Apr. 23, 2012

(65) Prior Publication Data

US 2013/0281237 A1  Oct. 24, 2013

(51) Int. Cl.
*B62M 9/121* (2010.01)
(52) U.S. Cl.
USPC ............................................. 474/80
(58) Field of Classification Search
USPC ................................. 474/80, 78, 82
See application file for complete search history.

(56) References Cited

U.S. PATENT DOCUMENTS 5,494,307 A * 2/1996 Anderson ................. 474/80
5,649,877 A * 7/1997 Patterson ................. 474/80

* cited by examiner

*Primary Examiner* — William E Dondero
*Assistant Examiner* — Diem Tran
(74) *Attorney, Agent, or Firm* — Raymond Y. Chan; David and Raymond Patent Firm (57) ABSTRACT

A rear derailleur is adapted to be secured to a side of a rear fork portion of a vehicle frame. When the front derailleur pull tight or release a transmission cable, a transmission lever is move back and forth in a threaded shaft base and a foot portion of a lever control cable also pulls a chain retaining lever to rotate, so that a position of a distal point of the rotating chain retaining lever resulting from a movement of a retracing spring is changed. Accordingly, effects such as gear shift-up, gear fixing, gear shift-down, and angle adjusting of chain retaining steering wheel are achieved. In addition, occurrence of disorder of the derailleur system and slipping off of the chain are reduced.

9 Claims, 13 Drawing Sheets

REAR DERAILLEUR

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

1. Field of Invention

The present invention relates to a rear derailleur, and more particularly to a rear derailleur for bicycle, wherein when a transmission lever is moving back and forth in a threaded shaft base, a foot end of a lever control cable pulls a chain lever to rotate, so that by means of a retracting spring, a distal point of the chain retaining lever can be guided to different positions. Thus, effects such as gear shift-up, gear fixing, gear shift-down, and angle adjusting of chain retaining steering wheel can thus be achieved. In addition, the operation of gear shifting is accurate and the slipping off of the chain is also prevented.

2. Description of Related Arts

Riding a bicycle has been developed from being a traditional transportation in the past to a bicycle-racing sport nowadays. People normally treat bicycle riding as a physical exercise for fitness and thus a derailleur system is introduced for making the riding more comfortably and faster in different riding conditions. A conventional derailleur system usually utilizes a transmission cable to tighten or release the derailleur. A lever and a spring of the cantilever type derailleur drive an activating lever to move, so that a chain which is engaged with a chain retaining steering wheel moves on a cassette so that different types of cassette crankset can be selected. And when a difference of the numbers of the sprockets between the front cranked and the rear cassette is minimized, less force is required to be applied on the pedal. Conversely, more effort is needed.

Currently, a rear derailleur usually is a cantilever-spring type derailleur that mainly has two types, i.e. a positive direction type and a negative direction type. An operation of a positive direction type derailleur is described as follows: when the derailleur is not in operation (not pulled by the transmission cable), the activating lever of the chain retaining steering wheel is at a position corresponding to the smallest chain wheel of the cassette (with the fewest number of sprockets). When the derailleur is in operation (the transmission cable is being pulled) to shift up, the activating lever of the chain retaining steering wheel moves towards a bigger chain wheel of the cassette, wherein the spring retained at the lever is becoming tightened when shifting up to a bigger chain wheel of the cassette (the pedaling force required is becoming less), for the difference of numbers of sprockets between the front crankset and the rear cassette being reduced. When the derailleur is shifting down (the transmission cable is being released), the spring is gradually returning to its original position (force free). Through a retracting resilient force of the spring, the activating lever of the chain retaining steering wheel moves towards to a smaller chain wheel of the cassette when the derailleur is shifting down (more and more pedaling force is becoming required).

A negative direction type derailleur is also developed, wherein its operation is opposite to the operation of the positive direction type deraillwur. When the derailleur is in operation (the transmission cable is being pulled), the activating lever of the chain retaining steering wheel moves towards a smaller chain wheel of the cassette, and conversely, when the transmission cable is being released, the activating lever of the chain retaining steering wheel moves towards to a bigger chain wheel of the cassette. Thus, it is effort-saving for the bicycle to climb on a slope. No matter the cantilever-spring type rear derailleur is in positive direction or negative direction, there is a common disadvantage that the lever and spring are exposed and easy to carry dirt and sand during operation, and even grass weeds may attach thereto, so that it is not only difficult to clean, but also may result in a disorder of the derailleur system and cause a slipping off of the chain. Thus the conventional derailleur is not convenient for use and the applicant herein provides a novel rear derailleur to achieve effects such as gear shift-up, gear fixing, gear shift-down, and angle adjusting of chain retaining steering wheel. The occurrence of disorder of the derailleur system and slipping off of the chain are also reduced.

SUMMARY OF THE PRESENT INVENTION

The invention is advantageous in that it provides a rear derailleur to achieve effects such as gear shift-up, gear fixing, gear shift-down, and angle adjusting of chain retaining steering wheel, as well as to reduce occurrence of disorder of the derailleur system and slipping off of the chain, wherein the rear derailleur is secured to a side of a rear fork portion of the bicycle frame. When the front derailleur pulls or releases the transmission cable, effects such as gear shift-up, gear fixing, gear shift-down, and angle adjusting of chain retaining steering wheel are achieved. In addition, when the bicycle is shifting between different cranksets (the chain is shifting from a bigger crankset to a smaller crankset, or the chain is shifting from a smaller crankset to a bigger crankset), the chain wheel guiding lever and the chain retaining steering wheel do not move to change their positions so that slipping off of the chain can be prevented. When the cassette is shifting between different chain wheels (the chain is shifting from a bigger chain wheel to a smaller chain wheel, or the chain is shifting from a smaller chain wheel to a bigger chain wheel), the chain wheel guiding lever will be pulled by the lever control cable to change its positions as so to adjust the angle of the chain retaining steering wheel so that the chain is tightened and thus slipping off of the chain is prevented.

Additional advantages and features of the invention will become apparent from the description which follows, and may be realized by means of the instrumentalities and combinations particular point out in the appended claims.

According to the present invention, the foregoing and other objects and advantages are attained by a rear derailleur comprising a threaded shaft base, a threaded shaft, a transmission lever, a chain retaining lever, and a lever control cable. The threaded shaft base comprises a sliding shaft at a bottom side thereof, wherein the sliding shaft has a receiving groove at a center thereof and a plurality of transmission guiding grooves at an outer periphery thereof, wherein the threaded shaft is received in the receiving groove, the threaded shaft comprises a cable clip at a front side thereof to retain the transmission cable in position, and a threaded shaft groove receiving a plurality of bearings at a bottom side thereof. The transmission lever has a sleeve hole at a front side thereof, a plurality of bearings received in the sleeve hole, and a guiding arm provided at an outer periphery thereof for retaining the plurality of bearings in position. An end of the transmission lever is pivotally connected to the chain retaining lever, wherein a first retracting spring and the lever control cable are provided between the chain retaining lever and the transmission lever, wherein a second retracting spring is provided between the chain retaining lever and a chain retaining steering wheel. The retracting forces of the first retracting spring and the second retracing spring make the chain retaining lever and the transmission lever return to original positions after moving under operation. A first foot portion of the lever control cable is installed to the threaded shaft base. A second foot portion of the lever control cable is installed to the transmission lever. A middle body portion of the lever control cable is wrapped on the chain retaining lever. An end portion of the lever control cable forms an encircling ring wrapped on a shift roller wheel. The lever control cable is used to restrict a distal point of the chain retaining lever which is moving under the force of the retracing springs. When the threaded shaft is pulled or released by the transmission cable to rotate. Since the guiding arm is restricted by the transmission guiding groove, the plurality of bearings received in the threaded shaft groove of the transmission lever guides the transmission lever to move back and forth in the threaded shaft base so as to pull or release the lever control cable. When the first foot portion of the lever control cable pulls the chain retaining lever to rotate, a distal point of the chain retaining lever which is moving under the force of the retracting force is changed, so that the chain is tightened and slipping of the chain is prevented. Thus, effects such as gear shift-up, gear fixing, gear shift-down, and angle adjusting of chain retaining steering wheel are thus achieved. The operation of gear shifting is accurate and slipping off of the chain is also effectively prevented.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

The following description is disclosed to enable any person skilled in the art to make and use the present invention. Preferable embodiments are provided in the following description only as examples and modifications will be apparent to those skilled in the art. The general principles defined in the following description would be applied to other embodiments, alternatives, modifications, equivalents, and applications without departing from the spirit and scope of the present invention.

In the following detailed description, reference is made to the accompanying drawings which form a part hereof, and is shown by way of illustration specific embodiments in which the invention can be reduced to practice. In this regard, directional terminology, such as "front", "rear", "side", "left", "right", "top", "bottom" etc., is used with reference to the orientation of the figures being described. Because components of embodiments of the present invention can be positioned in a number of different orientations, the directional terminology is used for purposes of illustration and is in no way limiting. The size numerals appeared in the spec and drawings may be varied according to different requirement without departure from the scope and spirit of the present invention.

Referring to FIG. 1 to FIG. 9 of the drawings, a rear derailleur 10 according to a preferred embodiment of the present invention is illustrated, wherein the rear derailleur 10 mainly comprises a threaded shaft base 20, a threaded shaft 30, a transmission lever 40, a chain retaining lever 50, and a lever control cable 70.

Figure 1:
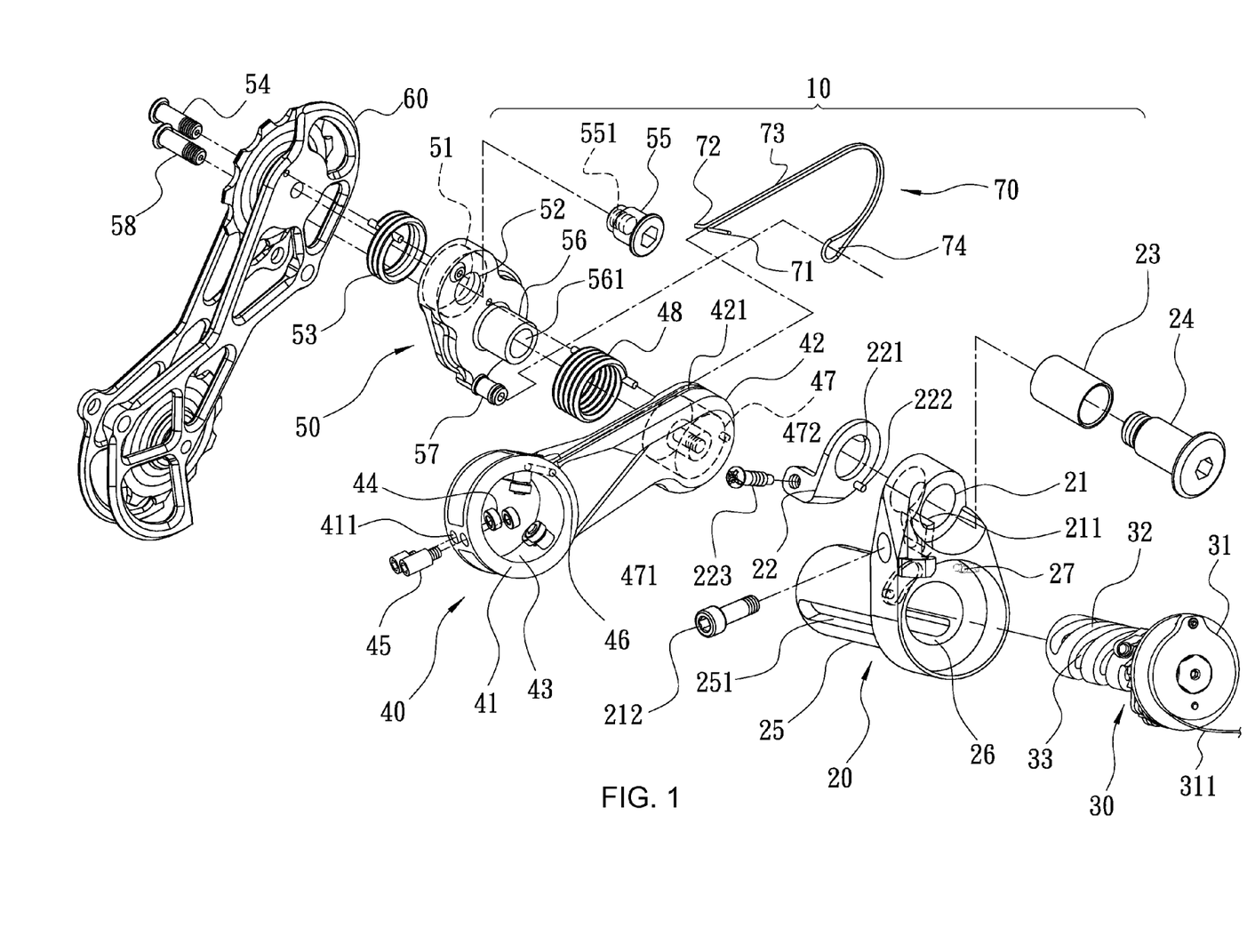
FIG. 1 is an exploded view of a rear derailleur according to a preferred embodiment of the present invention.
Figure 2:
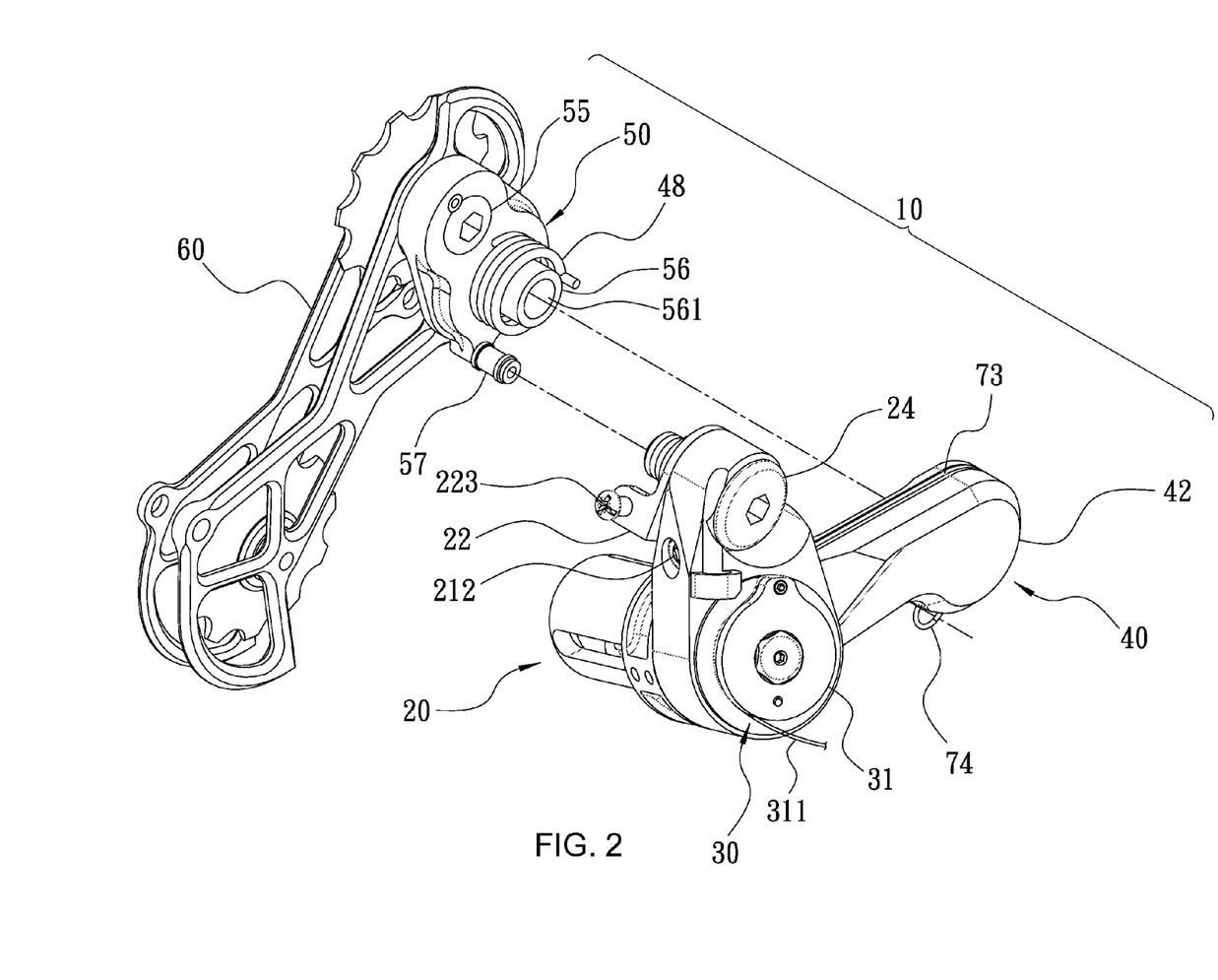
FIG. 2 is an another exploded view of the rear derailleur according to the above preferred embodiment of the present invention.
Figure 3:
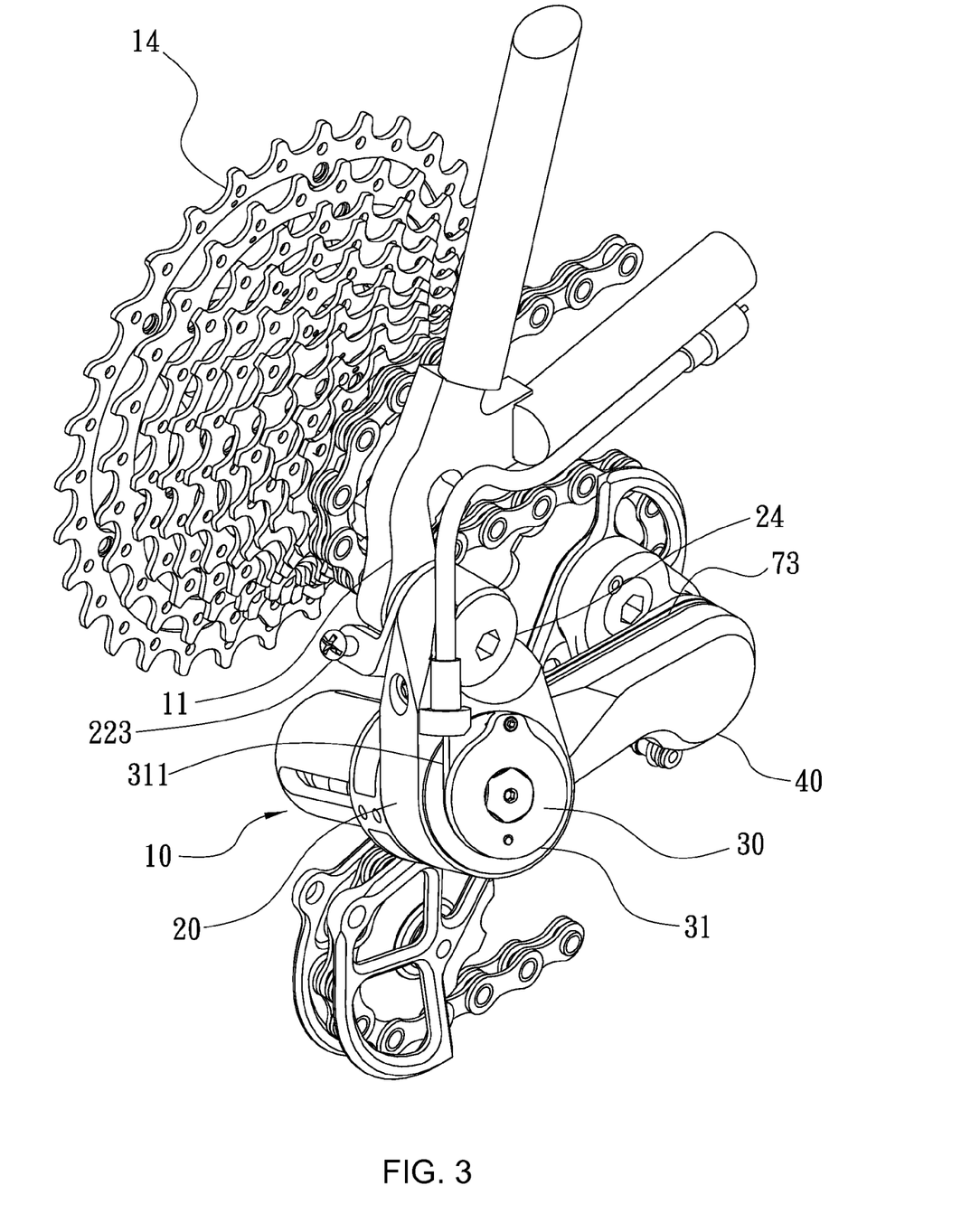
FIG. 3 is a schematic view illustrating the rear derailleur being fixed to a rear fork portion of a bicycle frame according to the above preferred embodiment of the present invention.
Figure 4:
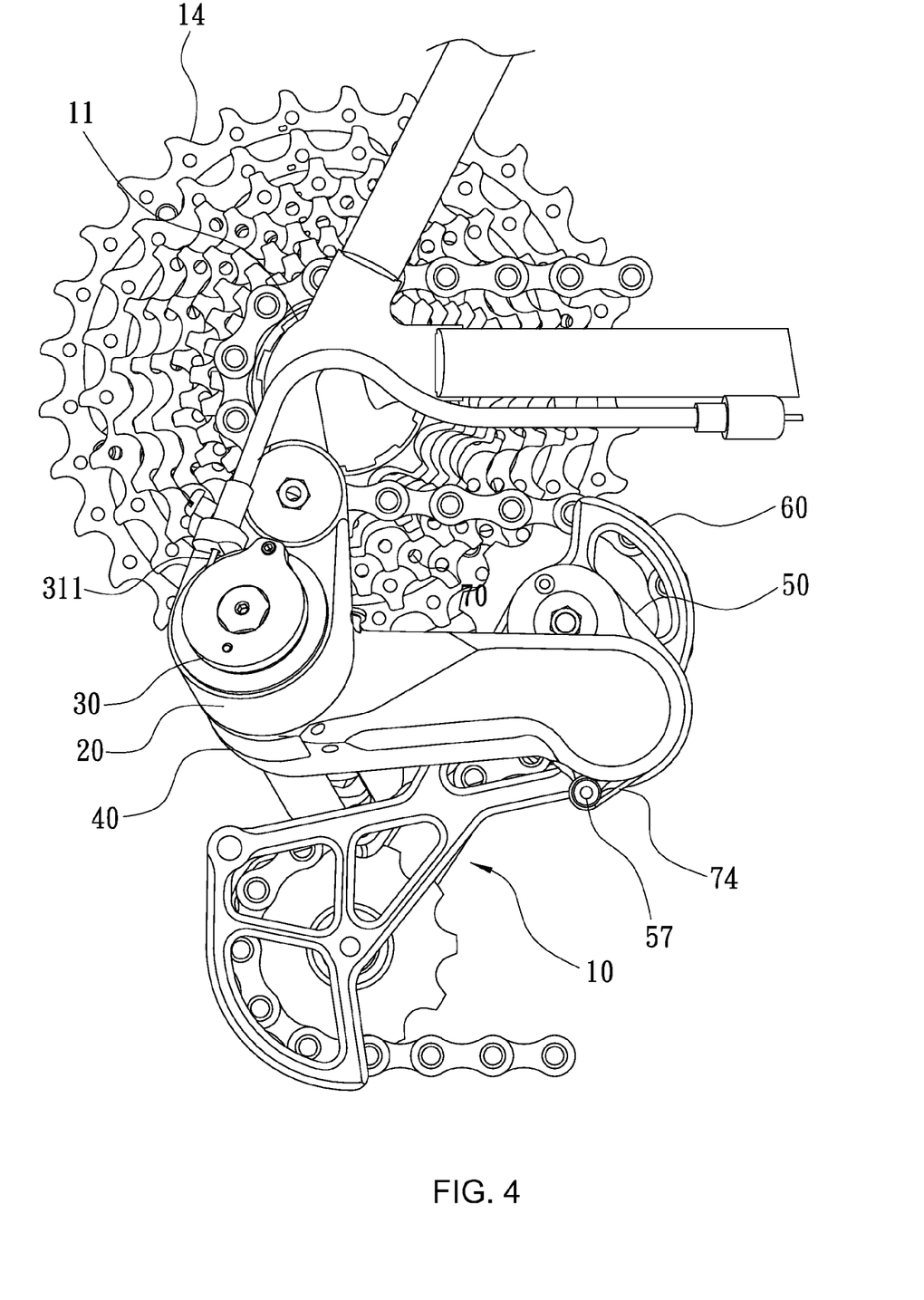
FIG. 4 is a sectional view illustrating the rear derailleur being fixed to a rear fork portion of a bicycle frame according to the above preferred embodiment of the present invention.

The threaded shaft base 20 is secured to a side of a rear fork portion 11 of a bicycle frame by a claw screw 24. The threaded shaft base 20 has an adjusting hole 21 and comprises an adjusting panel 22 at a lateral side of a top side portion thereof, wherein the claw screw 24 penetrating through a rotation bush 23 is received in the adjusting hole 21. The threaded shaft base 20 comprises a sliding arm 25 at a bottom side thereof, wherein the sliding arm 25 has a receiving groove 26 provided at a center thereof. A control cable penetrating hole 27 is provided at a top side of the receiving groove 26. The sliding arm 25 has a plurality of transmission guiding grooves 251 provided at an outer periphery thereof communicating with the receiving groove 26. The receiving groove 26 is adapted to receive the threaded shaft 30. A positioning groove 211 is provided on a bottom side of the adjusting hole 21. The adjusting panel 22 has a retention hole 221 provided at a center thereof and a protruding retention pole 222 provided at a bottom side thereof. The adjusting panel also comprises an adjusting screw 223 provided at a rear side thereof.

The threaded shaft 30 comprises a cable clip 31, which can retain a transmission cable 311 in position, and a threaded shaft body 32 having a screwing groove 33 adapted to receive a plurality of bearings 44.

The transmission lever 40 comprises a lever body 42 and a sliding sleeve 41 provided at a front side of the lever body 42. The sliding sleeve 41 has a sleeve hole 43 provided at a center thereof receiving a plurality of bearings 44. A plurality of penetrating holes 411 is provided in an outer periphery on both left side and right side thereof and is communicating with the sleeve hole 43. The transmission lever 40 comprises a guiding arm 45 provided at the periphery thereof for retaining the plurality of bearings 44 in the sleeve hole 43. The transmission lever 40 has one or more control cables 46 provided at each side of an outer circumference of the sleeve hole 43 and communicated with a control cable groove 421. The control cable groove 421 is provided at a top side of the lever body 42 of the transmission lever 40. The lever body 42 further has a pivot hole 47 provided in an end thereof, wherein a pivot arm 471 is received in the pivot hole 47. The pivot arm 471 has a screw hole 472 provided at a center thereof. The pivot hole 47 is adapted to receive a first retracting spring 48 and a pivot bar 56 of the chain retaining lever 50.

The chain retaining lever 50 has a pivot connecting hole 51 at a top side thereof, a penetrating aperture 52 communicating with the pivot connecting hole 51, a second retracting spring 53 received in the pivot connecting hole 51, a male screw 54, and a female screw 55. The male screw 54 penetrates the penetrating aperture 52 and the second retracting spring 53 in the pivot connecting hole 51 so as to be received in a female screw hole 551 of the female screw 55, so that the second retracting spring 53 and the chain retaining steering wheel 60 is retained in position. The pivot bar 56 and a shift roller wheel 57 are provided at a bottom side of the chain retaining lever 50. The pivot bar 56 has a bar penetrating hole 561 provided at a center thereof, and comprises the first retracting spring 48 housed on an outer periphery thereof and a screw 58 penetrating the bar penetrating hole 561 so as to be screwed in a screw hole 472 of the pivot arm 47 in the center of the pivot hole 47 at a rear side of the transmission lever 40, so that the chain retaining lever 50 is pivotally provided at a rear side of the transmission lever 40.

The lever control cable 70 comprises a first foot portion 71 penetrating the penetrating hole 27 of the threaded shaft base 20 and being retained on an outer edge at a top side of the receiving groove 26 of the threaded shaft base 30 by a first cable retaining screw 711. The lever control cable 70 further comprises a second foot portion 72 penetrating the control cable hole 46 of the sliding sleeve 43 of the transmission lever 40 and being retained on a side edge of the sliding sleeve 43 by a second cable retaining screw 721, a body portion encircledly provided in the control cable groove 421 of the lever body 42, and an end portion that forms an encircling ring 74 encircled on the shift roller wheel 56 of the chain retaining lever 50.

Figure 9:
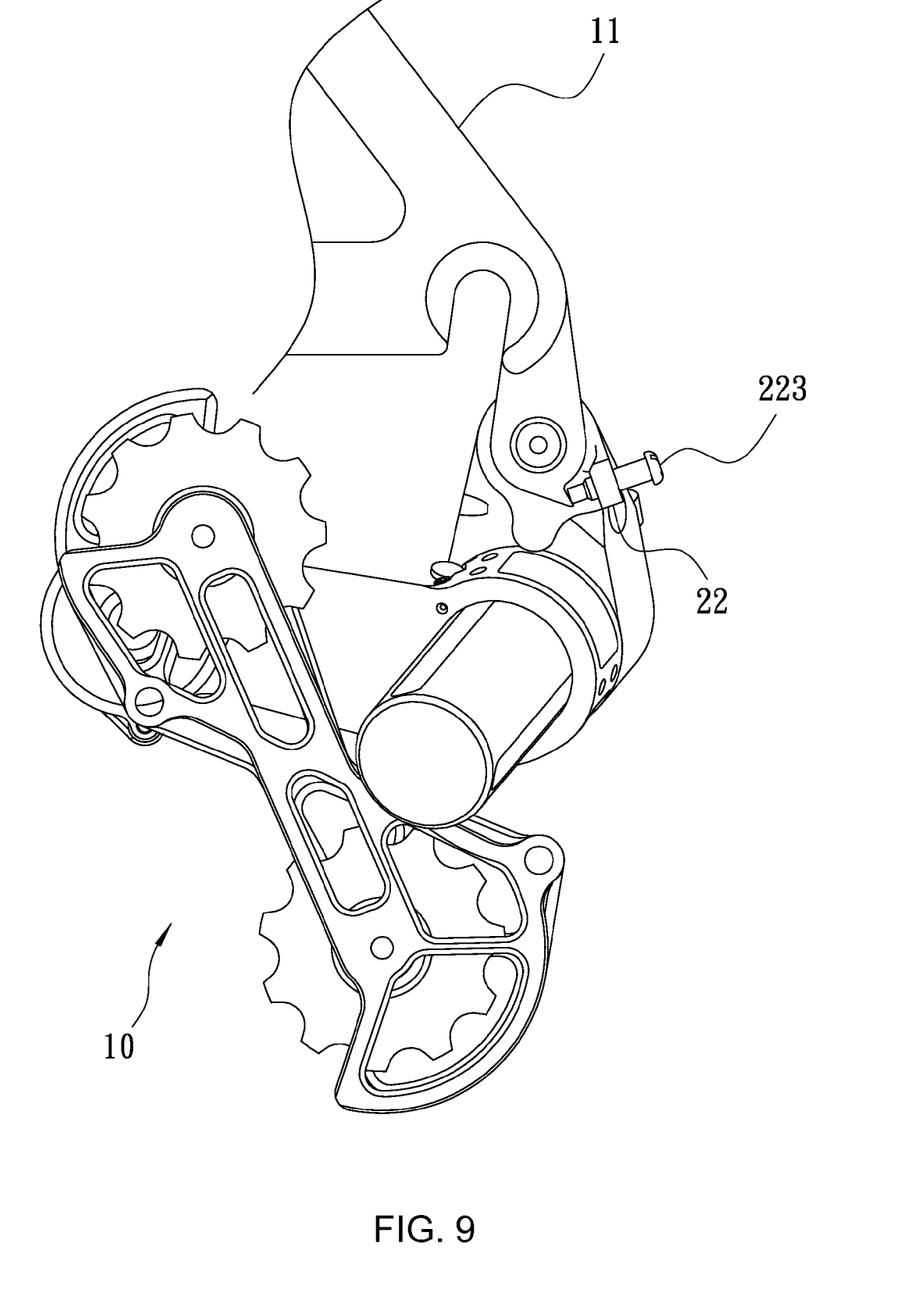
FIG. 9 is a schematic view illustrating the rear derailleur in a state in which an adjusting screw is not in operation according to the above preferred embodiment of the present invention.

FIG. 9 is a schematic view illustrating an adjusting of an angle of the whole rear derailleur. The adjusting panel 22 of the present invention is attached to a side edge of the adjusting hole 22, and that the retention pole 222 is inserted into the positioning groove 211 of the threaded shaft base 20, so that the adjusting panel 22 rotates to drive the threaded shaft base 20 to rotate simultaneously. In addition, the rotation bush 23 penetrates the retention hole 221 of the adjusting hole 21 and functions as an axle of the adjusting panel 22 and the threaded shaft base 23. The claw screw 24 penetrates the rotation bush 23 and thus the threaded shaft base 20. The adjusting panel 22 is retained at a side of the rear fork portion 11 of the bicycle frame. Thus, when the adjusting screw 223, which is retained on the rear fork portion 11 of the bicycle frame, is rotated to be in a released state or a tightened state, the adjusting panel 22 rotates clockwise or counterclockwise with respect to the rotation bush 23, so that the threaded shaft base 20 rotates simultaneously to adjust the angle of the rear derailleur 10. After adjusting of the angle of the rear derailleur 10 is achieved, the fastening screw 212 is rotated to be screwed into the positioning groove 211, so that the rotation bush 23 which is received in the adjusting hole 21 is tightened, and thus the rear derailleur 10 which has undergone the angle adjusting process is retained in position. Therefore, the present invention is advantageous in that the angle of the rear derailleur 10 can be adjusted and the positioning of the rear derailleur 10 which has undergone the angle adjusting process also can be achieved.

Figure 5:
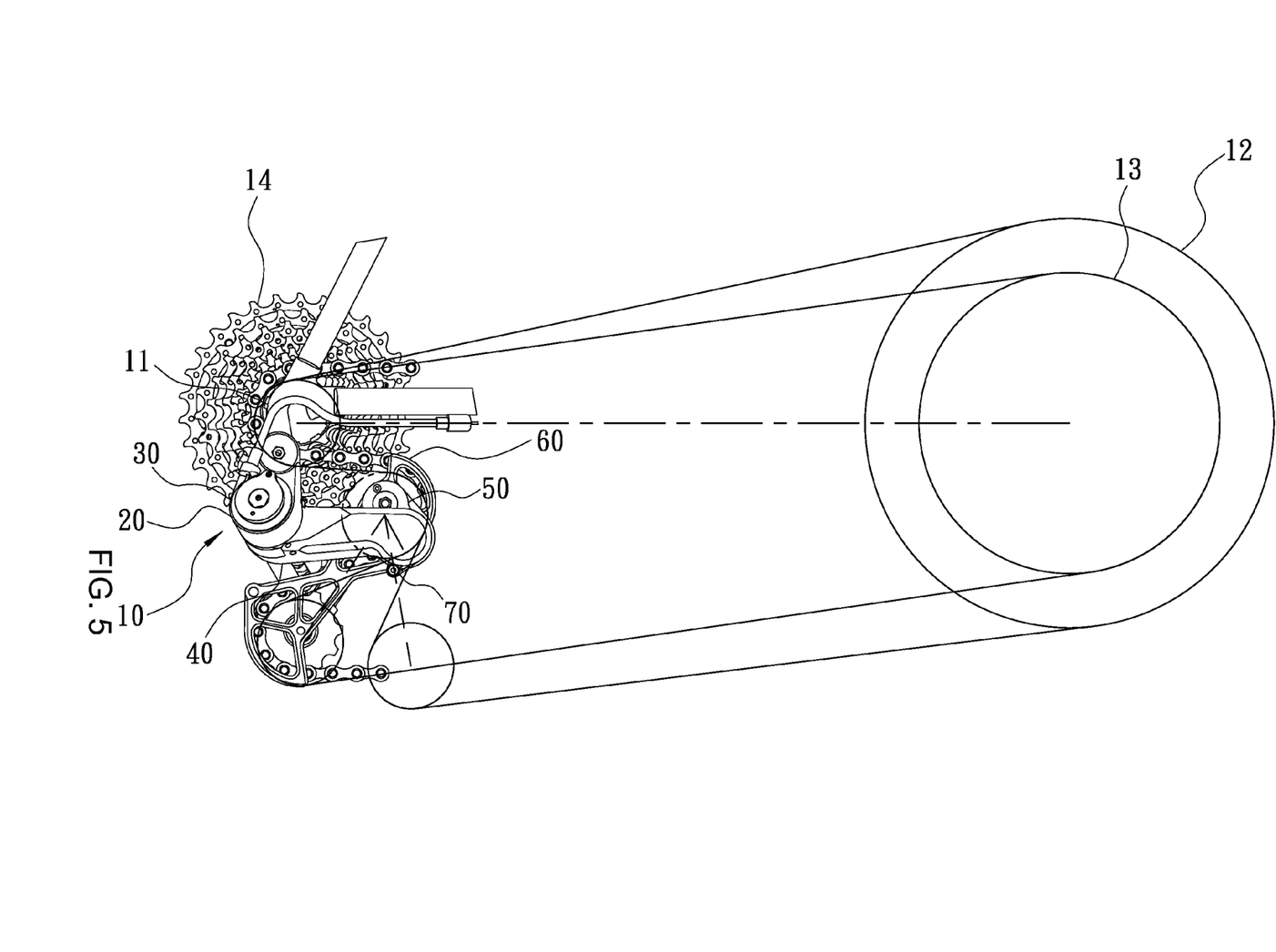
FIG. 5 is a schematic view illustrating shifting from a smaller crankset to a bigger crankset of the rear derailleur according to the above preferred embodiment of the present invention.
Figure 6:
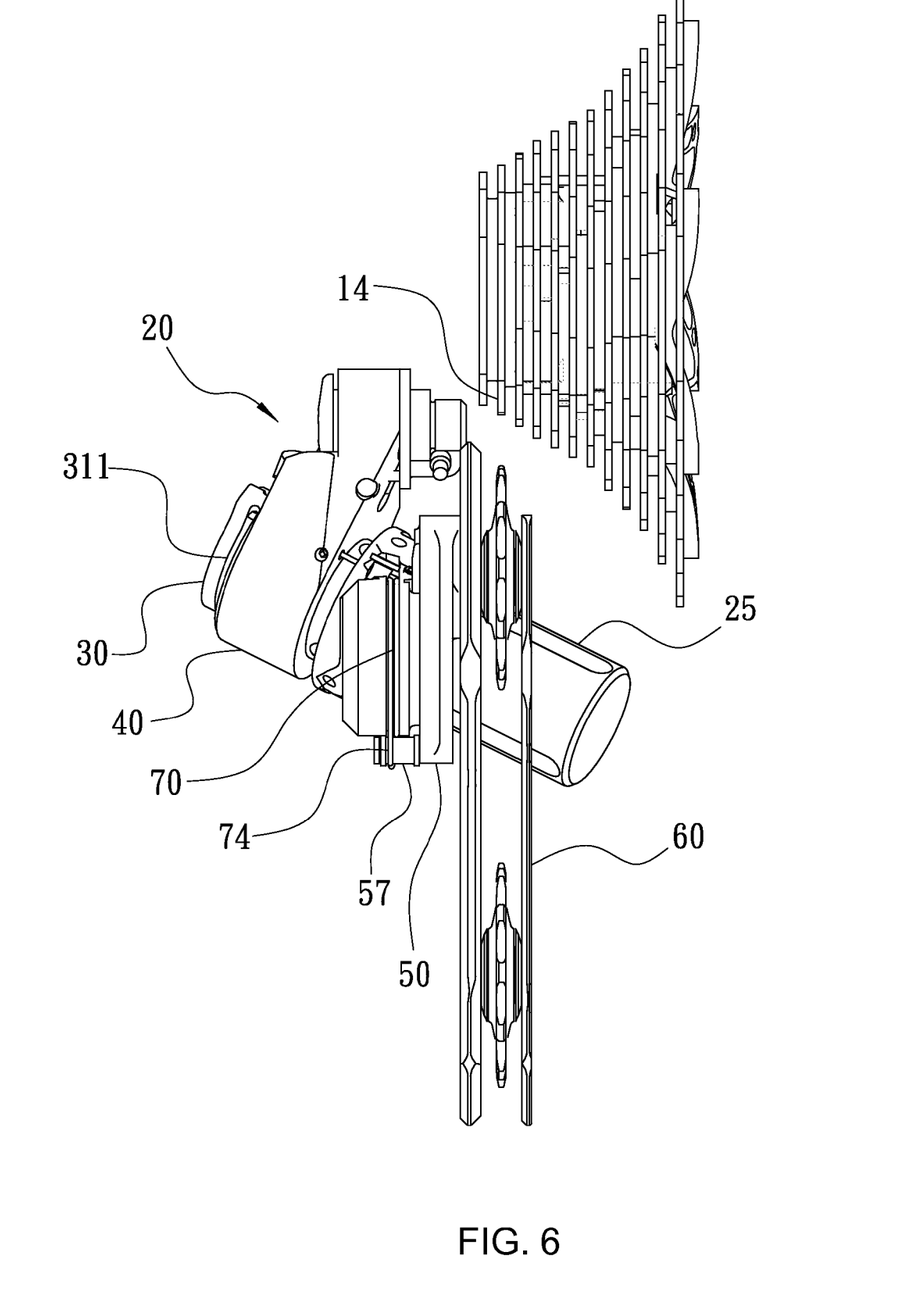
FIG. 6 is a schematic view illustrating the rear derailleur being in operation with a cassette chain wheel according to the above preferred embodiment of the present invention.
Figure 7:
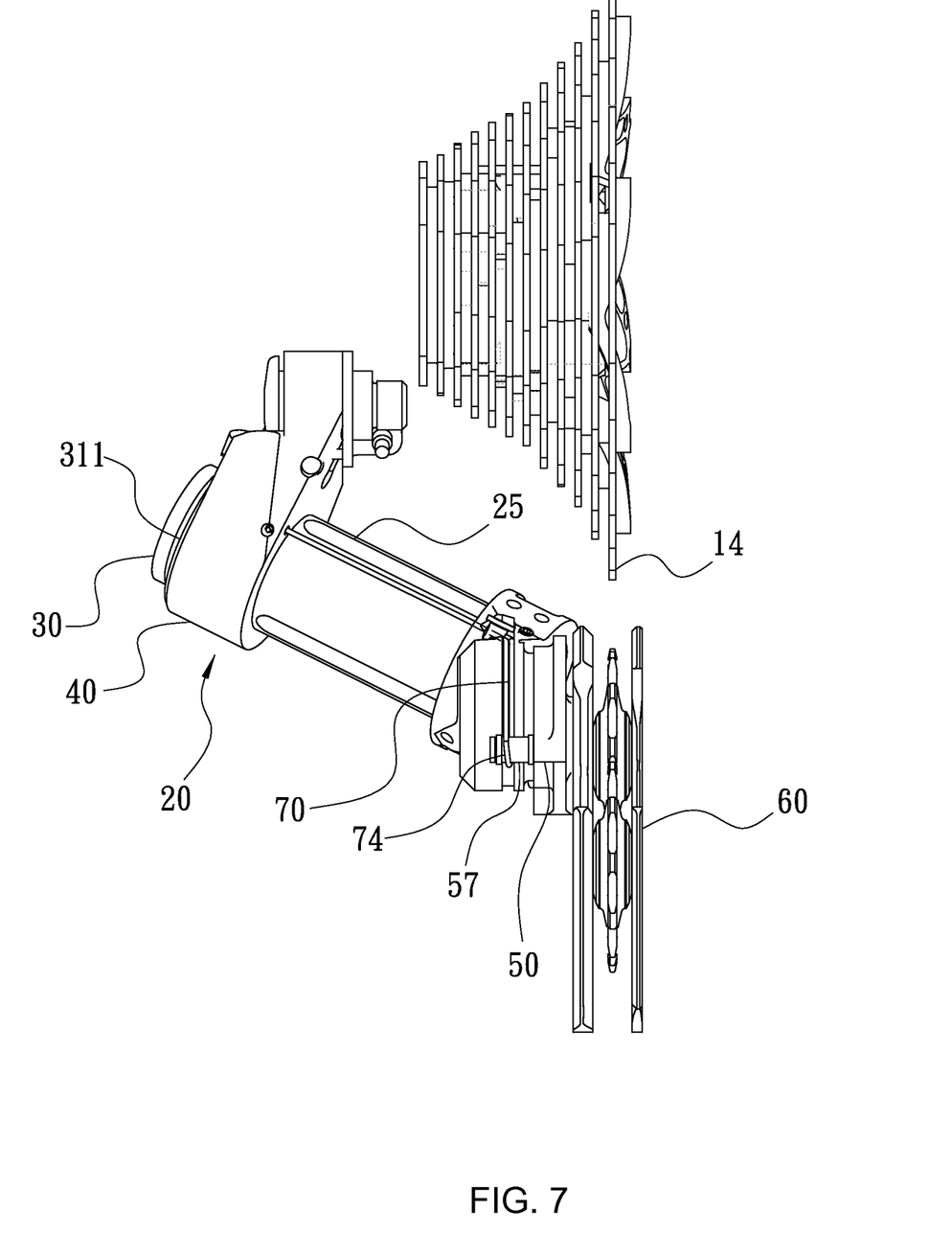
FIG. 7 is another schematic view illustrating the rear derailleur being in operation with a cassette chain wheel according to the above preferred embodiment of the present invention.
Figure 8:
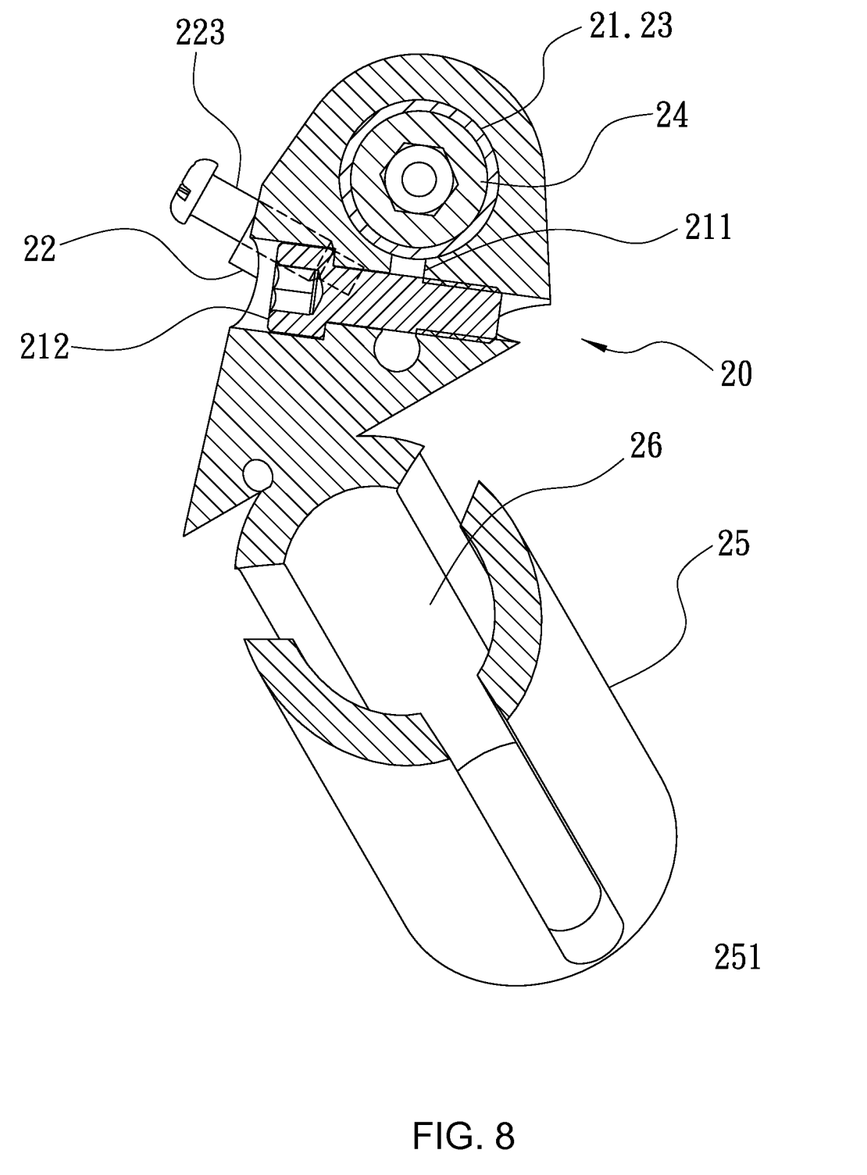
FIG. 8 is a sectional view illustrating a rotation bush of the rear derailleur being tightened according to the above preferred embodiment of the present invention.

Referring to FIG. 5 of the drawings, for the rear derailleur 10 of the present invention, when the bicycle is shifting between different cranksets 12, i.e. the chain is shifting from a bigger crankset 12 to a smaller crankset 13, or the chain is shifting from a smaller crankset 13 to a bigger crankset 12, the chain wheel guiding lever 40 and the chain retaining steering wheel 60 do not move to change their positions so that slipping off of the chain can be prevented. When the cassette 14 is shifting between different chain wheels 14, i.e. the chain is shifting from a bigger chain wheel 14 to a smaller chain wheel 14, or the chain is shifting from a smaller chain wheel 14 to a bigger chain wheel 14, the chain wheel guiding lever 40 will be pulled by the lever control cable 70 to change its positions as so to adjust the angle of the chain retaining steering wheel 60 so that the chain is tightened and thus slipping off of the chain is prevented.

Referring to FIG. 1 to FIG. 10 of the drawings, when the transmission cable 311 pulls the threaded shaft 30 to rotate, through the driving effect of the plurality of bearings 44 in the screwing groove 33 of the screw shaft body 32, the chain wheel guiding lever 40 slides to guide the chain to shift from a smaller chain wheel 14 to a bigger chain wheel 14. When the chain wheel guiding lever 40 is sliding on the sliding shaft 25, the lever control cable 70 pulls the shift roller wheel 57 to move so that the position of the distal point of the chain retaining lever 50 during rotating which is caused by the first retracing spring 48 can be changed. In addition, the chain retaining lever 50 is rotated to drive the chain retaining steering wheel 60 to pull tight the chain, and thus effects such as gear shift-up, gear fixing, gear shift-down, and angle adjusting of chain retaining steering wheel are achieved.

Figure 10:
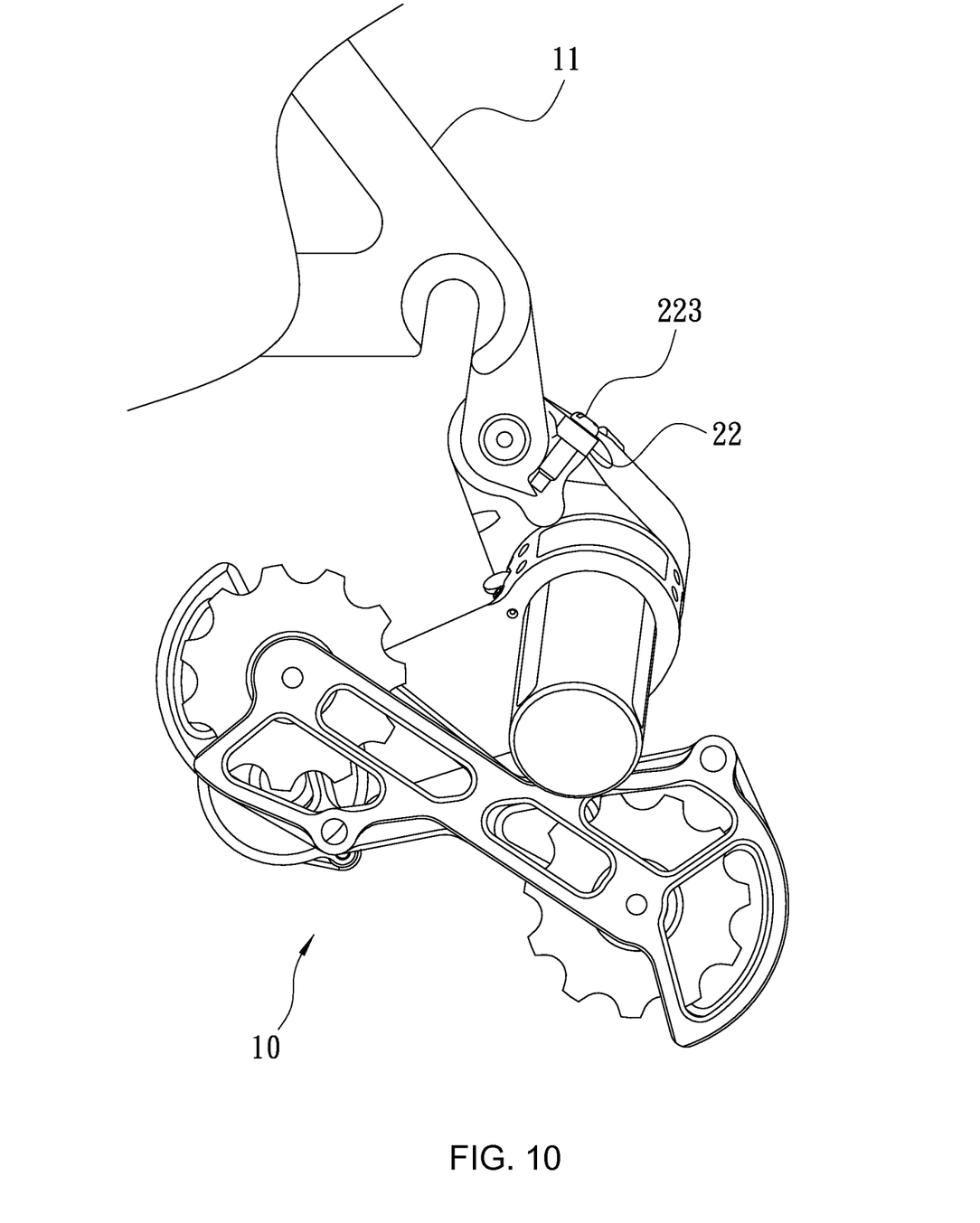
FIG. 10 is a schematic view illustrating the rear derailleur in a state in which an adjusting screw is in operation according to the above preferred embodiment of the present invention.
Figure 11:
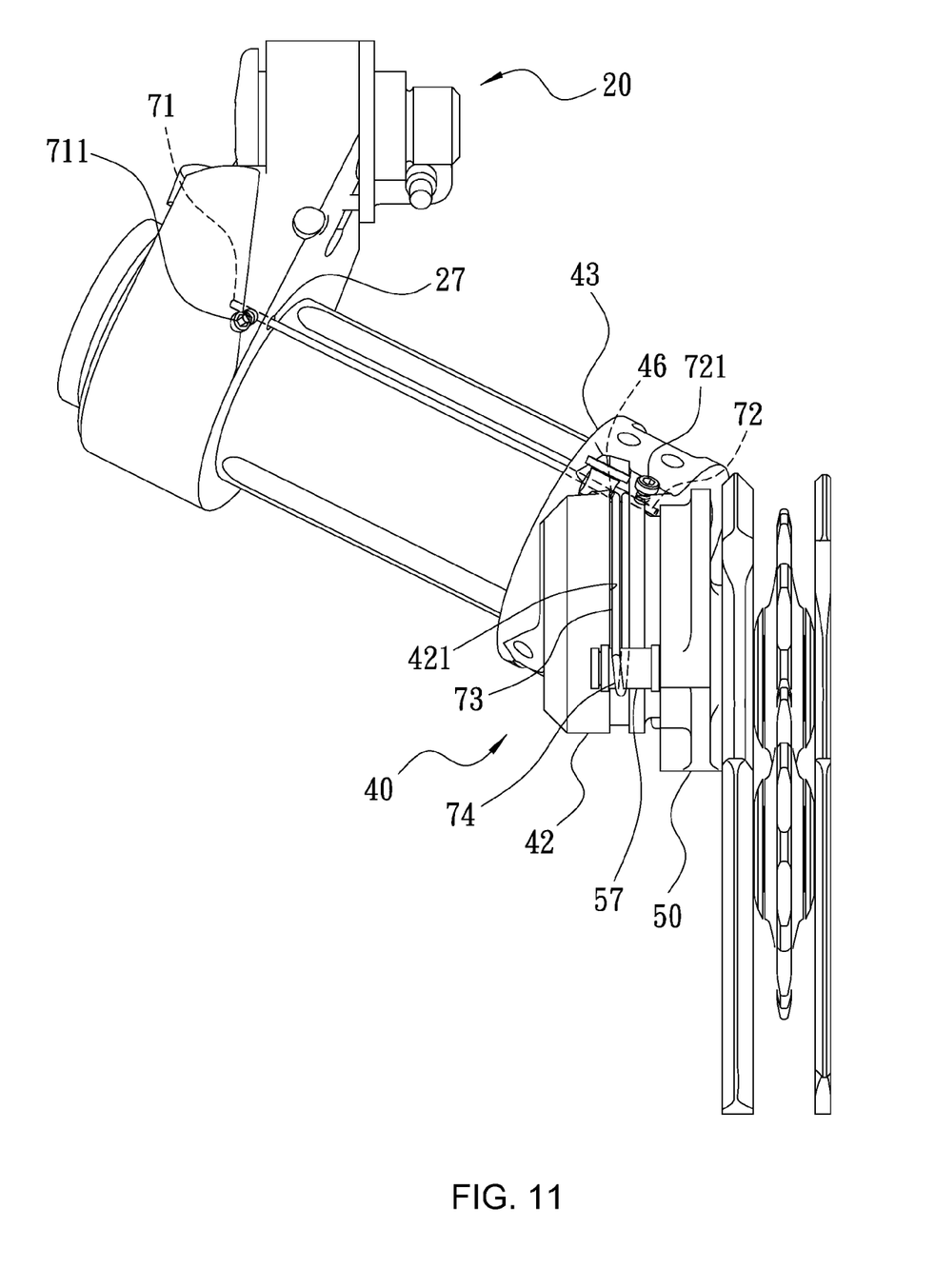
FIG. 11 is a schematic view illustrating the lever control cable of the rear derailleur being retained in position by a retaining screw according to the above preferred embodiment of the present invention.

Referring to FIG. 10 of the drawings, the lever control cable 70 comprises a first foot portion 71 penetrating the penetrating hole 27 of the threaded shaft base 20 and being retained on an outer edge at a top side of the receiving groove 26 of the threaded shaft base 30 by a first cable retaining screw 711, a second foot portion 72 penetrating the control cable hole 46 of the sliding sleeve 43 of the transmission lever 40 and being retained on a side edge of the sliding sleeve 43 by a second cable retaining screw 721, a body portion encircledly provided in the control cable groove 421 of the lever body 42, and an end portion forms an encircling ring 74 encircled on the shift roller wheel 56 of the chain retaining lever 50.

Referring to FIG. 1 to FIG. 10 of the drawings, during a transmission process, the transmission cable 311 pulls the threaded shaft 30 to rotate, through the driving effect of the plurality of bearings 44 in the screwing groove 33 of the screw shaft body 32, the sliding sleeve 43 of the chain wheel guiding lever 40 is guided to slide on the sliding shaft 25, because of that the first foot portion 71 of the lever control cable 70 is retained on the outer edge at a top side of the receiving groove 26 of the threaded shaft base 30 and the second foot portion 72 is retained on the side edge of the sliding sleeve 43. The encircling ring 74 is encircled on the shift roller wheel 56 of the chain retaining lever 50.

Figure 12:
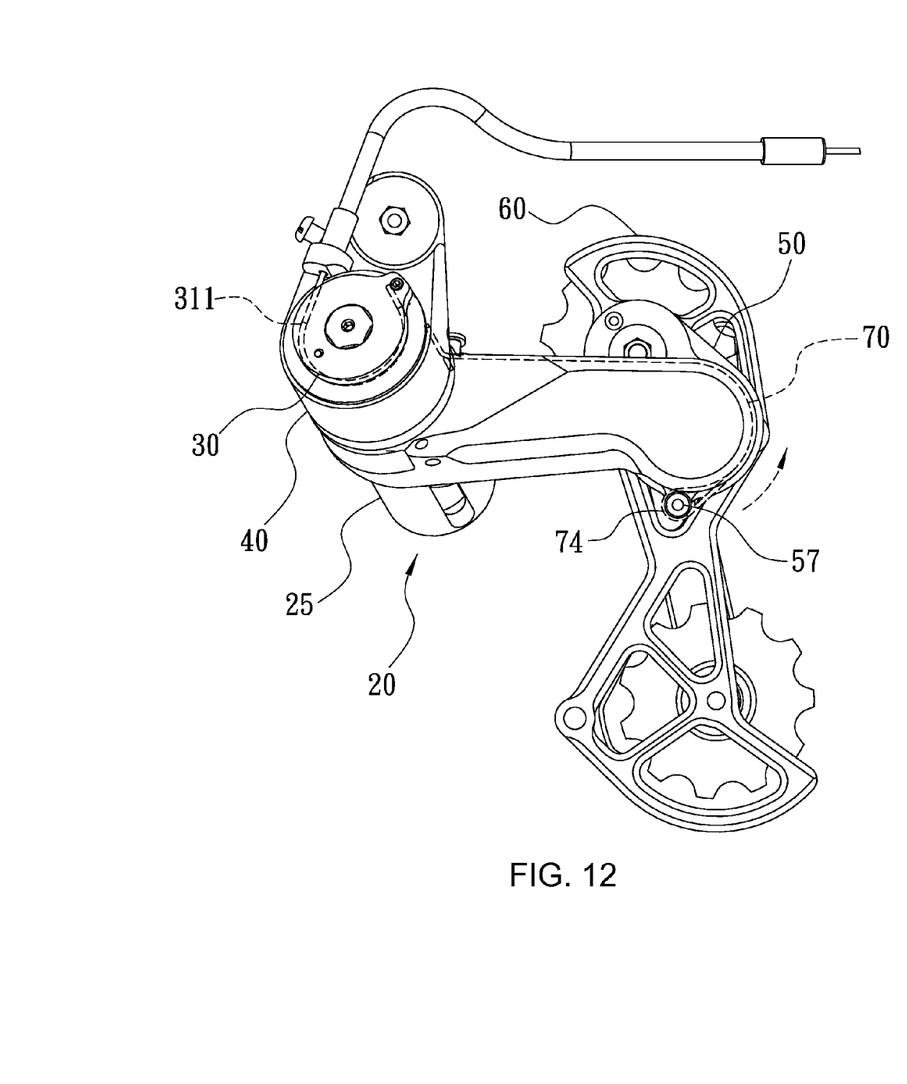
FIG. 12 is a schematic view illustrating the rear derailleur in a state in which the rear derailleur is not in operation to pull the lever control cable for transmission according to the above preferred embodiment of the present invention.
Figure 13:
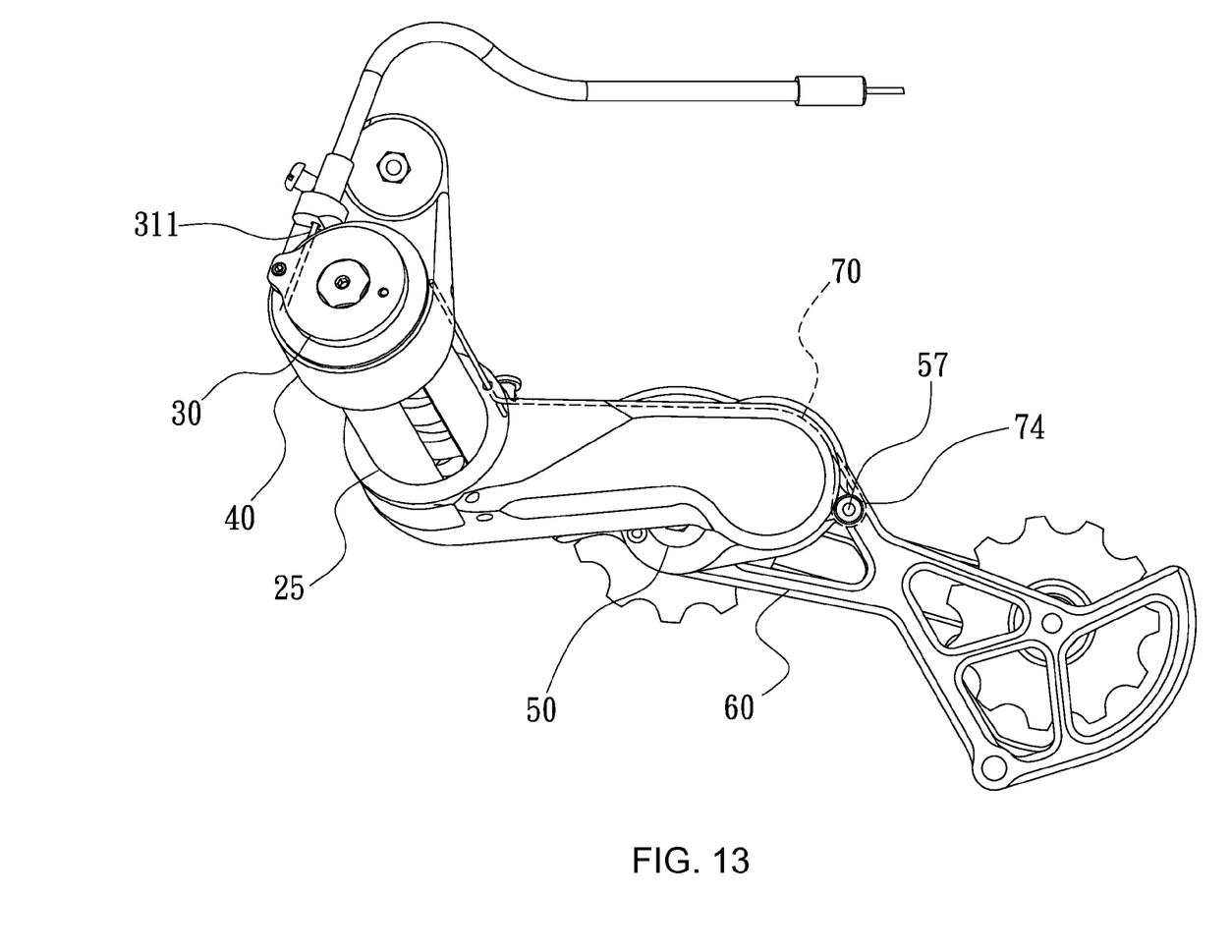
FIG. 13 is a schematic view illustrating the rear derailleur in a state in which the rear derailleur is in operation to pull the lever control cable for transmission according to the above preferred embodiment of the present invention.

Referring to FIG. 12 to FIG. 13 of the drawings, when the sliding sleeve 43 is sliding on the sliding shaft 25, the encircling ring 74 pushes the shift roller wheel 57 to move, so that the whole chain retaining lever 50 is rotated to change its position to adjust the angle of the chain retaining steering wheel 60 so as to pull tight the chain. Accordingly, slipping off of the chain is prevented and thus the operation of gear shifting is accurate and occurrence of slipping off of the chain is also reduced.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A rear derailleur of sleeve-axle type, comprising:
a threaded shaft base having an adjusting hole provided in a side edge at a top side thereof, and comprising an adjusting panel provided at said side edge at said top side thereof, a rotation bush, a claw screw penetrating said rotation bush and being received in said adjusting hole, a sliding shaft at a bottom side thereof, and a positioning groove provided at a bottom side of said adjusting hole, wherein said sliding shaft has a receiving groove provided at a center thereof and a plurality of transmission guiding grooves provided at an outer periphery thereof, wherein said adjusting panel has a retention hole provided at a center thereof, and comprises a protruding retention pole provided at a bottom side thereof and an adjusting screw provided at a rear side thereof;
a threaded shaft comprising a threaded shaft body having a screwing groove, and a cable clip provided at a front side thereof;
a transmission lever comprising a lever body, a sliding sleeve being provided at a front side thereof connecting to said lever body and having a sleeve hole provided at a center of said sliding sleeve, and a plurality of bearings received in said sleeve hole, a plurality of penetrating holes being provided in an outer periphery on both left side and right side thereof while communicating with said sleeve hole, a control cable groove being provided in said lever body, a pivot hole being provided at an end of said lever body, wherein said screwing groove of said threaded shaft is capable of receiving said plurality of bearings;
a chain retaining lever having a pivot connecting hole and a penetrating aperture at a top side thereof communicating with each other, wherein said chain retaining lever further comprises a second retracting spring provided in said pivot connecting hole, a pivot bar, and a shift roller wheel provided at a bottom side thereof, wherein said pivot bar has a bar penetrating hole at a center thereof and a first retracting spring is provided on an outer periphery thereof, wherein said pivot hole is capable of receiving said first retracting spring and is also used for pivotally connecting said chain retaining lever with said transmission lever; and
a lever control cable comprising a first foot portion penetrating said penetrating hole of said threaded shaft base in such manner that said first foot portion is retained on an outer edge at a top side of said receiving groove of said threaded shaft base, a second foot portion penetrating said control cable hole of said sliding sleeve in such a manner that said second foot portion is retained on a side edge of said sliding sleeve, a body portion encircledly provided in said control cable groove of said lever body, and an end portion forming an encircling ring encircled on said shift roller wheel of said chain retaining lever.

2. The rear derailleur, as recited in claim 1, further having a control cable penetrating hole provided at a top side of said receiving groove, wherein said receiving groove is capable of receiving said threaded shaft.

3. The rear derailleur, as recited in claim 1, wherein when said adjusting screw is operated to tighten or release, said rotation bush is rotated to change an angle of said rear derailleur so as to adjust said angle of said rear derailleur.

4. The rear derailleur, as recited in claim 1, further comprising a transmission cable, wherein said cable clip is used for retaining said transmission cable in position.

5. The rear derailleur, as recited in claim 1, further comprising a male screw and a female screw penetrating said pivot connecting hole and said penetrating aperture which are provided at said top side of said chain retaining lever, wherein said rear derailleur further comprises a chain retaining steering wheel, wherein said male screw and said female screw are engaged with each other, so that said chain retaining steering wheel and said second retracting spring are retained in position.

6. The rear derailleur, as recited in claim 1, wherein said first retracting spring is housed on said outer periphery of said pivot bar, wherein said pivot bar further comprises a screw penetrating said bar penetrating hole to be in a position in which said screw is fixed in said pivot hole at said rear side of said transmission lever in such a manner that said chain retaining lever is pivotally provided at a rear side of said transmission lever.

7. The rear derailleur, as recited in claim 1, wherein said threaded shaft body has said screwing groove for driving and guiding said plurality of bearings.

8. The rear derailleur, as recited in claim 1, wherein when said transmission lever is sliding on said sliding shaft, said lever control cable pulls said shift roller wheel to move, so that said chain retaining lever is rotated corresponding to a movement of said retracting spring so as to change a position of a distal point thereof.

9. The rear derailleur, as recited in claim 1, wherein when said chain retaining lever is pulled by said lever control cable to rotate, a chain retaining steering wheel is guided to pull tight a chain, so that effects including gear shift-up, gear fixing, gear shift-down, and angle adjusting of said chain retaining steering wheel are achieved.

* * * * *